United States Patent [19]
Galvagni

[11] Patent Number: 5,639,507
[45] Date of Patent: Jun. 17, 1997

[54] METHOD OF MAKING A PLANAR MULTI-LAYER CAPACITOR

[75] Inventor: John Galvagni, Surfside Beach, S.C.

[73] Assignee: AVX Corporation, Myrtle Beach, S.C.

[21] Appl. No.: 433,172

[22] Filed: May 3, 1995

[51] Int. Cl.⁶ .................................................. B05D 5/12
[52] U.S. Cl. ........................... 427/79; 427/276; 427/277; 427/287; 427/289; 427/347; 427/367
[58] Field of Search ..................... 427/79, 276, 277, 427/287, 289, 347, 367

*Primary Examiner*—Bernard Pianalto
*Attorney, Agent, or Firm*—Paul J. Sutton

[57] ABSTRACT

A method of manufacturing a terminated ceramic capacitor comprises forming the capacitor in the configuration of a parallelepiped having end surfaces joining the major base portions which define an acute angle with one base and an obtuse angle with the other. Electrodes of opposite polarities are exposed at the opposite end surfaces. A conductive coating, generally of metal or metal frit is applied to the entire end and base surfaces, the side surfaces being maintained clear of termination material. By removing termination materials from the acute angle junctions of end and base surfaces there is provided a capacitor which may be inserted into a circuit by contact with the opposite bases or the opposite ends. the invention relates also to the unique resultant capacitor.

4 Claims, 2 Drawing Sheets

METHOD OF MAKING A PLANAR MULTI-LAYER CAPACITOR

BACKGROUND AND FIELD OF THE INVENTION

The present invention is directed to a method of manufacturing a planar ceramic capacitor and to the unique resultant capacitor. More particularly, the invention is directed to a method of facilitating the termination of a ceramic capacitor, and a resulting capacitor which is highly desirable in that it affords great flexibility in mounting, i.e., to a PC board or the like.

The invention is further is directed to capacitor of the type described wherein the termination adds materially to the capacitance of the device and, by reason of the ready accessibility of the termination material, affords a means for varying the capacity by eroding a portion or portions of the termination.

THE PRIOR ART.

Ceramic capacitors find application in virtually every electronic device. With the demand for miniaturization of electronic equipment there has been a concomitant demand for reduction in the size of ceramic capacitors employed therein. As a result, the fabrication of miniature ceramic capacitors, and particularly termination of such capacitors has become an increasing complex procedure. The most compact of ceramic capacitors, namely the so-called "lead less" capacitors are often only a few millimeters in their largest dimension. The typical lead less ceramic capacitor is comprised of a monolithic block of ceramic having electrodes of one polarity exposed at a first end, and electrodes of opposite polarity exposed at the other end. The ends of the electrodes remote from the exposed ends terminate short of the opposite end of the capacitor. The described capacitor is terminated, i.e. is provided with a conductive material coating or layer at each of the respective ends of the capacitor, each such coating contacting the electrodes exposed at the respective end. Obviously, if any portion of the termination material at one end bridges or contacts termination at the other end the device is short circuited and non-functional.

Given the minuscule size of the smallest ceramic capacitors, it will be readily recognized that the operation of applying conductive material to the respective ends of the capacitors which material provides effective electrical contact with the exposed electrodes without short circuiting to the opposite termination is a highly complex procedure.

The typical ceramic capacitor is in the configuration of a right-parallelepiped. Electrodes are exposed at opposed ends of the block. Termination is conventionally applied by masking the capacitor such that only the end surface to be terminated is exposed. Thus masked, termination material is applied, i.e. by a vapor deposition process such as sputtering. After a first termination is applied the capacitor is removed from the mask and remasked in a manner which shields the terminated and exposes the unterminated end. An example of a process involving the masking and remasking steps is disclosed in U.S. Pat. No. 4,561,954 owned by the assignee hereof. As will be apparent, the process of masking a multiplicity of capacitors of extreme miniature size, unmasking and then remasking following application of termination material is both time and labor intensive.

Noted below are patents located in the course of a prior art search.

3330696 teaches forming capacitors by sequentially vapor depositing metal, dielectric and metal onto a substrate, thereafter via electron beam cutting away the upper electrode to adjust capacitance. Termination pads are applied prior to vapor deposition. 3604082 discloses capacitors formed by applying a slurry of particulate metal over crystallizable glass frit in a binder. The metal is applied in partial overlapping condition and after burn-out and compression the mask is cut along lines exposing non-overlapping metal areas for subsequent termination.

3864825 relates to a micro-electronic resistor formed by laying down on a substrate sequential layers of progressively lower resistance and cutting through the layers to reach a desired resistance value.

4089094 discloses variable capacitors, contacts to the stator plates being effected by scratching the side of the stator stack.

4347650 owned by the assignee hereof discloses forming marginless capacitors by stacking sheets with elongate electrode patterns and severing in the non-overlapping electrode areas with subsequent termination along the severance lines.

4453119 likewise owned by the assignee herein discloses forming capacitors by vapor depositing sequential dielectric layers, the dielectric material covering edge portions of adjacent electrodes. By cutting along pre-determined severance lines electrodes of the same polarity are exposed at opposite edges of the capacitors, sputtering of the opposite edges being isolated from edges of opposite polarity by the overlapping dielectric components.

SUMMARY OF THE INVENTION

Broadly stated, the present invention, greatly simplifies the termination of a ceramic capacitor, and while the concept is primarily beneficial in respect of miniature ceramic capacitors, the invention is not to be construed as limited thereto. In accordance with the method of the invention, capacitors are formed in the configuration of a parallelepiped characterized in that, the ends of the structure whereat the electrode edges are exposed are angularly oriented relative to the upper and lower bases of the structure so that each end defines an acute angle with one said base and an obtuse angle with the other said base.

In accordance of the invention, termination is effected by coating the entirety of the bases and ends of the structure, i.e. by vapor deposition of one or more layers.

As it will be apparent, the capacitor is now short circuited and non functional. The next step in the manufacturing process involves removing at least the metalized coating, and preferably, some of the underlying ceramic material at the acute angle apex portions defined at the junction between the base portions and end portions. The noted apex portions, being acute, facilitate the removal of material by a Transverse abrading process, or, in certain instances, by a tumbling process, which preferentially, will remove material at the sharpened acute angle portion.

As will be apparent from the foregoing description, the bulk application of termination material to the entirety of the capacitor eliminates the precision masking heretofore required for shielding one end surface while exposing the other end surface. In accordance with the method of the invention, the side edges of the capacitors are preferably, mutually, shielded by forming a stack of capacitors in side-to-side abutting relation forming a block or stack of capacitors the base and end surfaces of which are exposed and the side surfaces of which are shielded.

In an alternate mode of practicing the invention, a block in the shape of an enlarged parallelepiped is sintered and the entire block metalized following which the block is severed forming individual capacitors the bases and end faces of which are metalized and the side surfaces, defined by the cutting steps, are free of metalized material. The individual capacitors thus formed are eroded or abraded at the acute angle junction of the bases and end portions to define a terminated capacitor.

The resulting capacitors have characteristics which render them highly desirable as compared with conventional capacitors. Specifically, the termination material covering both the upper and lower bases may, if desired, define with the nearest adjacent electrode, a further capacitance thus adding to the total capacitance of the device. Further, adjustments of the capacitors of the device, where precision is required, may be readily effected by eroding exposed portions of the termination material. A further advantage of the capacitor resides in the flexibility with which the same may be mounted to a mother board or the like. Specifically, contact may be made to the upper and lower bases, affording a low resistance relatively large conductor to capacitor contact area than would be the case with conventional capacitors wherein the termination is located only at the ends of the capacitor. Of course, the capacitor may be incorporated into the circuit the conventional manner of leadless capacitors, i.e. by a solder connector between the pads of a PC board and the ends of the capacitor.

As will be apparent from the foregoing it is an object of the present invention to provide an improved method of manufacturing ceramic capacitors which eliminates the time consuming and labor intensive practice of masking and remasking during application of termination material to electrodes of opposite polarity. A still further object of the invention is the provision of a novel capacitor characterized in that same can enable a flexible series of mounting options. Still, a further object of the invention is the provision of a capacitor wherein termination material functions to add to the capacitance, and by virtue of its accessibility for eroding, enables facile precise adjustments of capacitance.

DETAILED DESCRIPTION OF DRAWINGS

Figure 1:
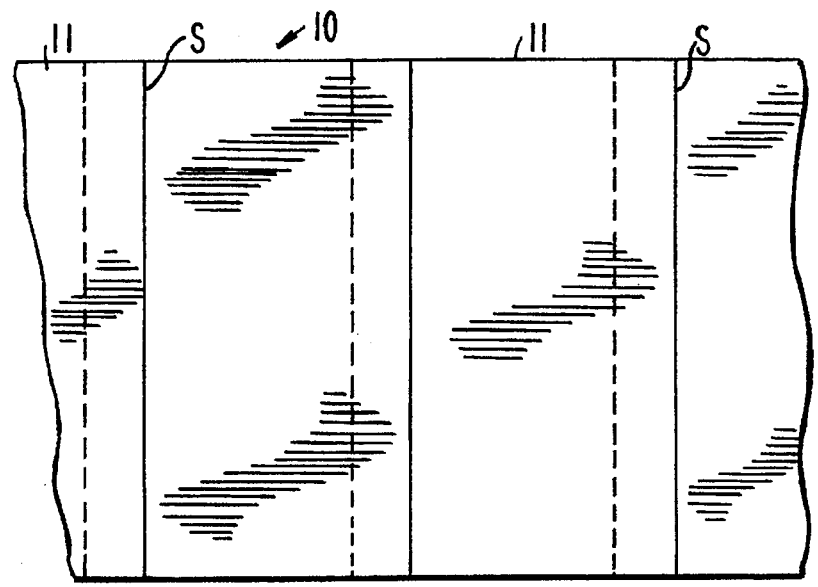
FIG. 1 is a schematic plan view of a band of material intended for fabricating into individual ceramic capacitors.
Figure 2:
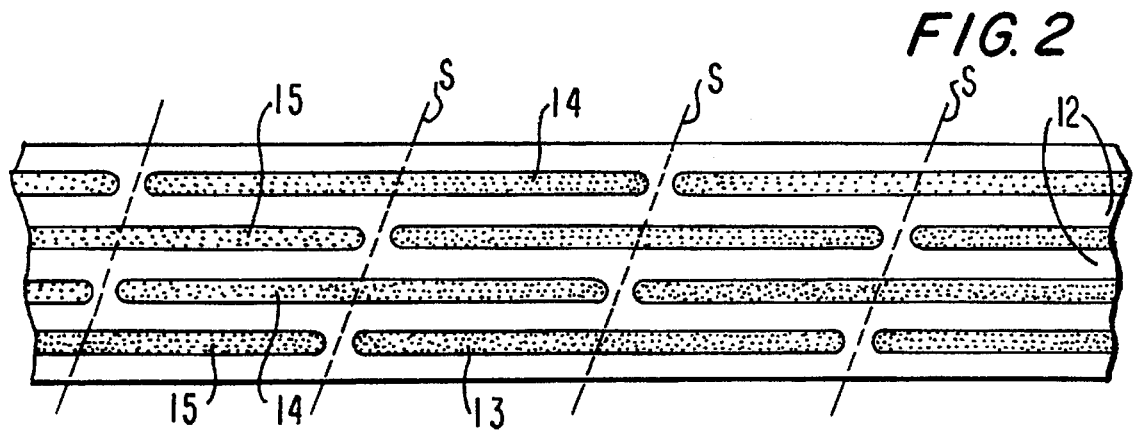
FIG. 2 is a schematic horizontal section taken on the lines 2—2 of FIG. 1.

Referring now to the drawings there is disclosed in FIG. 1 a plan view of a slab, (10) comprised of a series of green ceramic pre-forms (11) from which individual capacitor blanks are severed. The slab (10) is comprised of a series of layers of "green" ceramic material (12) having patterned areas (13) of electrode material. The technology by which ceramic capacitors are formed is well known, with specific formulation and processing details for ceramic and electrode material being described in references such as U.S. Pat. Nos. 4,347,650, 3,004,197 and 3,235,939 which are herein incorporated by reference.

Briefly stated, in accordance with conventional practice, finely divided ceramic particles having high dielectric constants, such as titanates of barium are mixed with binder material and solvents to form a excruitable mass which may be processed into thin sheets or bands. By a silk-screening process, or the like, areas of electrode materials are printed on the bands, the electrode material being selected from the group of noble metal such as platinum and paladium. The patterned bands are thereafter stacked in precisely predetermined relation so as to align the electrode forming areas in adjacent layers in a predetermined partially overlapping condition. As shown in U.S. Pat. No. 4,347,650, the layers of electrode material are arranged such that by dicing at pre-determined positions along severance lines perpendicular to the plane of the stacked layers, electrode material in alternate layers is exposed at opposite edges of the severed increments, the patterning being such that electrodes of one polarity are exposed at one severance line and electrodes of opposite polarity at the next adjacent severance line, the major portions of the respective electrodes being in over lapping relationship for the major body portion of the capacitor.

In accordance with the method and apparatus of the instant invention, and in contrast with the conventional practice set herein above, the electrode patterns in alternate layers, i.e. patterns 14 and 15 are oriented in such manner that the stack, (11) must be severed at angle oriented severance lines S to achieve the desired end result of having edge portions only of alternate layers exposed at opposite edges of the severed stack. By way of example, and with reference to FIG. 4, by cutting along severance lines S electrodes (16) are exposed at one edge (17) with electrodes (18) being exposed at edge (19).

Figure 3:
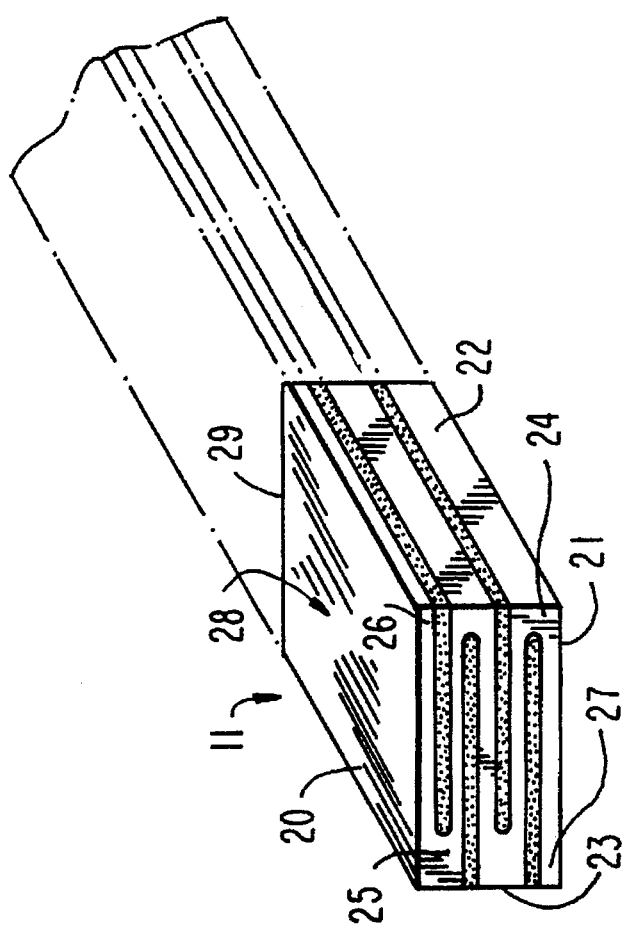
FIG. 3 is a schematic perspective view of a block or slab of a pre-form from which individual capacitor components may be severed.

As will be apparent, severing along lines S, the severance angle being preferably about 45 degrees plus or minus 10 degrees) will result in the formation of multiplex capacitor preforms (11) configured as parallelepipeds. As best seen in FIG. 3, the preforms include upper and lower base portions (20, 21) respectively, joined by end portions 22, 23. Each of the end portions (22, 23) defines an acute angle, e.g. (24, 25) with one of the bases (20, 21) and an obtuse angle (26, 27) with the other of the bases.

In accordance with the preferred practice, a number of capacitor perform blanks (28) are severed from the multiplex pre-form (11) along spaced severance lines (29), the severance lines being directed perpendicular to the surface of the multiplex preforms, severance lines (29) defining the side edges of the parallelepiped capacitor pre-form (28). As will be apparent to those skilled in the art, the capacitors of the illustrated embodiment have been depicted as employing two electrodes of each polarity only, i.e. 4 electrodes. In practice, the capacitors may includes up to 50 or more electrodes.

Figures 4, 5, 6:
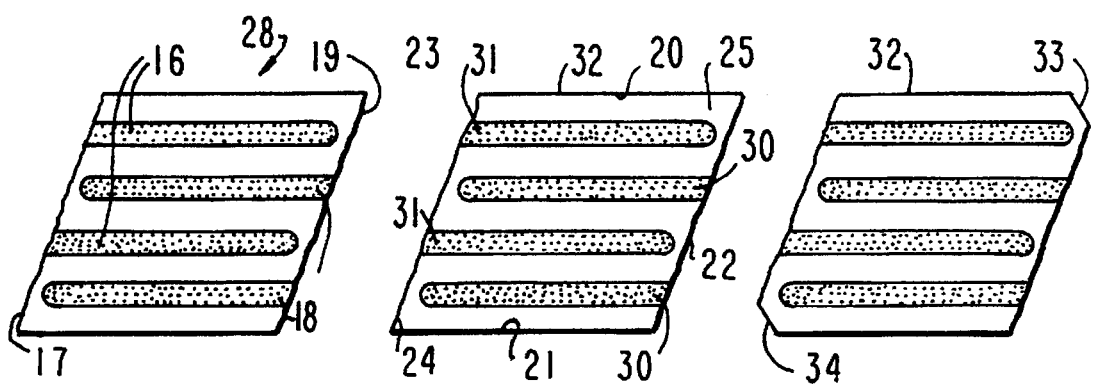
FIGS. 4, 5 and 6 are schematic sectional views illustrating sequential stages in the manufacture of an individual ceramic capacitor.

The severed green ceramic capacitor preforms (28) are thereafter subjected to the conventional fabrication steps of burnout to remove binder and subsequent sintering at high temperatures to convert the ceramic into monolithic ceramic capacitors as shown in Section in FIG. 4.

Termination of the finished capacitor is effected by forming, over the entirety of the upper and lower bases (20, 21) and the end portions (22, 23) a metalized coating which bonds to the noted surfaces and to the exposed portions (30, 31) of the electrodes at the end portions. Application of the terminating coating (32) is preferably effected by a vapor deposition step such as sputtering. The side edges (29) of the capacitors are shielded from this sputtered deposition, shielding being, preferably effected by stacking the capacitors in side by side relation whereby the sides of adjacent capacitors are mutually shielded against application of metal. Alternatively it is feasible to metalized the entire exposed surfaces of multiplex preforms (11) after same has been sintered as a unit and thereafter severing, e.g. by diamond saw, individual capacitors from the multiplex preform. The latter method is not preferred due to the substantial waste of material in the kerf of the sawing operation and the need to clear the sawed edges of bridging metal. It is likewise feasible, rather than providing a multiplex band, to provide a single narrow band from which individual capacitors are severed. While the metalizing layer (32) has been illustrated for simplicity as comprised of a single layer of metal, metalizing is desirably effected in a series of layers, the preferred metals being chromium, nickel and silver, in that order. The procedures for multi-layer metalizing are well known in the art and accordingly detailed descriptions thereof are unnecessary.

Figure 7:
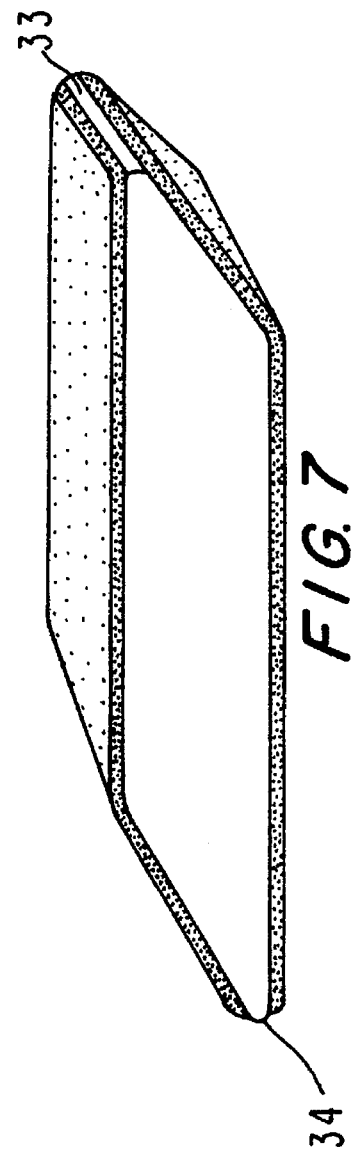
FIG. 7 is a perspective view of a finished capacitor in accordance of the invention.

The fabrication of the capacitors from the metalized condition of FIG. 5 to the finished condition of FIG. 6 involve removing the metalizing material at least from the acute angle junctions (24, 25). Desirably removal is effected by an abrading step, which, in addition to removing the metalized material (32) at the acute apices also removes portions of the ceramic beneath the apices. The finished capacitor is shown in FIG. 6 and FIG. 7 where in areas (33, 34) of the ceramic are exposed by the abrading step.

Figure 8:
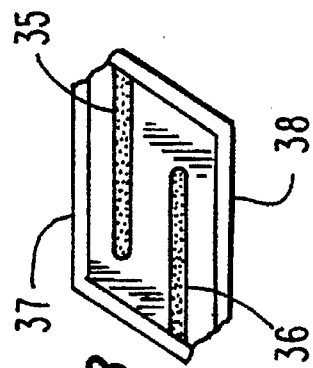
FIG. 8 is a schematic sectional view through a capacitor wherein the termination is arranged to add to the capacitance.

The removal of metal from apex portions (24, 25) is greatly facilitated by the acute angle defined thereat. A significant advantage of the Capacitor resides in the ability, in the event such is desired, of including the termination material as an element of, i.e. an addition to the capacitance of the device. Such an arrangement is shown schematically in FIG. 8 hereof. In the capacitor of FIG. 8, electrode 35 reacts to define a capacitance both with electrode 36 and the metalized portion, 37, of the termination which parallels electrode 35. In similar fashion, portion (38) of the metalization forms an additional capacitance with electrode 36. The construction of FIG. 8 makes possible a precise adjustment or trimming of the capacitor by simply removing increments of portions 37, and 38.

Obviously, numerous variations of the capacitor devices illustrated and methods of fabricating same will occur to skilled artisans in the field in light of the instant disclosure and hence the invention is to be broadly construed within the scope of the claims. It is, of course, feasible to coat portions of the capacitor with insulation in situations in which possible short circuiting or contact, i.e. with the side exposed electrodes is counter-indicated. The capacitor provides great flexibility in respect of mounting, it being possible to insert same in the circuit by contact with the major base portion or by contact with termination material at the inclined end portions of the device.

I claim:

1. The method of manufacturing a terminated ceramic capacitor comprising the steps of forming a ceramic capacitor in the configuration of a parallelepiped having parallel upper and lower bases, parallel side surfaces and parallel end surfaces, each said end surface defining an acute angle junction portion with one said base and an obtuse angle with the other said base, said capacitor includes internal electrodes parallel to said bases, alternate said electrodes being exposed at opposite said end surfaces, thereafter forming a metallic coating over said bases and end surfaces only, and thereafter removing said coating in registry with said junction portions.

2. The method in accordance with claim 1 wherein said step of removing said coating also removes portions of ceramic material at said junctions.

3. The method in accordance with claim 1 and including the steps of forming a multiplicity of said ceramic capacitors, stacking said capacitors in side by side array to form a stack wherein the side surfaces of adjacent capacitors are in abutting registry, thereafter metalizing the entire exposed surfaces of said stack, namely the bases and end surfaces, removing said coating from said junction portions of said capacitors while said capacitors are in said stacked array, and thereafter separating said capacitors forming said stack.

4. A method of manufacturing a ceramic capacitor in the general configuration of a parallelepiped comprising the steps of forming a planar green ceramic matrix, comprised of a plurality of ceramic layers having patterned electrode layers intervening between said ceramic layers, severing said matrix along parallel spaced severance lines angularly oriented to the plane of said matrix to thereby defined a plurality of multiplex capacitor preforms in the configuration of parallelepipeds having parallel upper and lower bases and parallel end portions extending between said bases, each said end portion defining an acute angle junction portion with an opposite one of said bases, electrode layers of opposite polarity being exposed at opposite end portions, thereafter severing said preform along spaced parallel lines perpendicular to said end portions to defined capacitor preforms, thereafter sintering said capacitor preform to form capacitors, thereafter forming a continuous conductive termination coating over said base and end surfaces of said capacitors, and thereafter removing portions of said coating and said ceramic in areas in registry with said acute angle junction portions thereby defining two electrically isolated coating areas each covering a different one of said base and end portions.

* * * * *